United States Patent
Bansal et al.

(10) Patent No.: US 10,635,498 B2
(45) Date of Patent: Apr. 28, 2020

(54) PRIORITIZING MANAGED DEVICES FOR IT MANAGEMENT

(71) Applicant: Dell Products L.P., Round Rock, TX (US)

(72) Inventors: Ankit Bansal, Bangalore (IN); Vaideeswaran Ganesan, Bengaluru (IN); Krishna Kumar Gupta, Hooghly (IN); Ajit Kumar Padhi, Ganjam (IN)

(73) Assignee: Dell Products L.P., Round Rock, TX (US)

( * ) Notice: Subject to any disclaimer, the term of this patent is extended or adjusted under 35 U.S.C. 154(b) by 308 days.

(21) Appl. No.: 15/588,150

(22) Filed: May 5, 2017

(65) Prior Publication Data
US 2018/0321969 A1    Nov. 8, 2018

(51) Int. Cl.
*G06F 9/50*    (2006.01)
*G06F 11/30*    (2006.01)

(52) U.S. Cl.
CPC ........ *G06F 9/5061* (2013.01); *G06F 11/3017* (2013.01)

(58) Field of Classification Search
None
See application file for complete search history.

(56) References Cited

U.S. PATENT DOCUMENTS

| | | | |
|---|---|---|---|
| 2006/0218551 A1* | 9/2006 | Berstis | G06F 9/4881 718/102 |
| 2009/0235264 A1* | 9/2009 | Ohno | G06F 9/5072 718/103 |
| 2014/0173189 A1* | 6/2014 | Park | G06F 9/4806 711/103 |
| 2014/0215479 A1* | 7/2014 | Riemers | G06F 9/4881 718/103 |
| 2017/0126794 A1* | 5/2017 | Khadiwala | G06F 11/1092 |
| 2018/0041408 A1* | 2/2018 | Dagum | H04W 24/10 |

\* cited by examiner

*Primary Examiner* — Wynuel S Aquino
*Assistant Examiner* — Melissa A Headly
(74) *Attorney, Agent, or Firm* — Jackson Walker L.L.P.

(57) ABSTRACT

A management resource and method monitor management operations associated with a group of managed devices, assign significance factors the management operations, and record instance information, identifying the managed device and the management operation, for each management operation performed. For each managed device, an interest factor is determined for each management operation. Weighting factors are determined for each managed device based on the interest factors and the significance factors. A management console display may be generated wherein the display indicates, whether in graphical or textual form, high priority managed devices, where the high priority devices are selected from the entire population of managed devices, based on the weighting factors. The IT administrator may adjust a weighting factor threshold to adjust the magnitude or extent of the filtering.

18 Claims, 5 Drawing Sheets

| Functional area | Detail | Significance factor [SF] |
|---|---|---|
| Device Health monitoring | This is one of the major area where admin keep focusing | 1 |
| Alerts acknowledged - Manually | Alert is an information on health/event occur in device side. This will something where admin perform continues actions e.g. close, acknowledge, set correlation | 0.9 |
| Alerts acknowledged - using script | This is kind of automatic alert acknowledgement, which will have less SF than manual operation. | 0.7 |
| Firmware deployment | It always updated during deployment. Hence does not contribute much to the significance factor | 0.05 |
| Firmware update | If only critical updates are applied to system-set, then system-set is mostly having highly critical workloads | 0.1 |
| Device Provisioning | One time operation, which admin need to perform for setup an infrastructure | 0.1 |
| Reporting | Admin creates a report to see an overall event pattern which will help to take some important decisions | 0.5 |
| Longevity of deployment | The longer a system is deployed and not repurposed (continues in same role), it may be critical. | 0.8 |
| Inventory collection | This will help Admin to provide a holistic device view. | 0.7 |

| Operation | Number of operation [N] | Operation time period [OTP] | Frequency [F = O / OTP] | Interest Factor [IF = F * 10] |
|---|---|---|---|---|
| alerts/events acknowledged by admin | 15 | 5 | 3 | 30 |
| correlation rules created | 5 | 10 | 1 | 5 |
| Number of Critical/Warning health | 5 | 2 | 1 | 25 |
| Generate a report | 7 | 10 | 1.4 | 7 |
| Open device 1x1 console | 2 | 5 | 0.4 | 1.3 |
| Check updates | 4 | 30 | 0.8 | 1.3 |
| device firmware update | 1 | 40 | 0.2 | 0.3 |

| Operation | Significance factor [SF] | Interest Factor [IF] | Weightage Factor [WF = SUM (SF*IF) / 10] |
|---|---|---|---|
| alerts/events acknowledged by admin | 1 | 21 | 2.1 |
| correlation rules created | 0.9 | 8 | 0.72 |
| Number of Critical/Warning health | 0.3 | 6 | 0.18 |
| Generate a report | 0.2 | 11 | 0.22 |
| Open device 1x1 console | 0.1 | 2 | 0.02 |
| Check updates | 0.1 | 10 | 0.1 |
| device firmware update | 0.7 | 8 | 0.56 |
| | | Final WF [Device 'N'] | 3.9 |

FIGURE 4

| Operation | Significance factor [SF] | Interest Factor [IF] | Weightage Factor [WF = SUM (SF*IF) / 10] |
|---|---|---|---|
| alerts/events acknowledged by admin | 1 | 30 | 3 |
| correlation rules created | 0.9 | 10 | 0.9 |
| Number of Critical/Warning health | 0.3 | 10 | 0.3 |
| Generate a report | 0.2 | 14 | 0.28 |
| Open device 1x1 console | 0.1 | 4 | 0.04 |
| Check updates | 0.1 | 8 | 0.08 |
| device firmware update | 0.7 | 2 | 0.14 |
| | | Final WF [Device 'M'] | 4.74 |

PRIORITIZING MANAGED DEVICES FOR IT MANAGEMENT

TECHNICAL FIELD

The present disclosure generally relates to information handling systems and, more specifically, managing a plurality of information handling systems.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling system's may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

In a data center environment, a large number of information handling systems may be located within a specially designed building or group of buildings, owned and operated by a business or by a service provider that provides IT services and/or resources to the entity. Information technology (IT) administrators may be required to perform various IT management tasks. Management tasks may include, by way of example, system and network health monitoring tasks, firmware/software deployment tasks, resource provisioning tasks, control connection tasks, auditing tasks, performance monitoring and management tasks, as well as other tasks. A data center may house thousands of devices and, in such cases, the need for efficient IT management is paramount to ensure that finite IT administrator resources are used efficiently.

SUMMARY

Disclosed subject matter addresses and improves issues associated with identifying devices of interest or high priority devices within a data center or similar environment.

Disclosed subject matter improves device management effectiveness by identifying and prioritizing managed systems of most interest to IT administrators. Once high priority systems are identified, IT resources can be allocated accordingly, with high priority systems receiving a greater fraction of the available IT resources than low priority systems. As an example, a particular management task may be performed more frequently on a higher priority device and less frequently on a lower priority device.

Disclosed systems determine a 'degree of interest' for one or more managed devices. The degree of interest may quantitatively influence the device's priority status to identify devices with high priority, need, and/or importance. Disclosed embodiments filter device information based on an administrator's interest, as reflected in the significance factors, and device's need for attention as reflected in the interest factor.

In accordance with disclosed subject matter, a disclosed management resource and method monitor one or more management operations associated with a group of managed devices, assign significance factors to at least some of the one or more management operations, and record instance information, identifying the managed device and the management operation, for each management operation performed. In addition, a disclosed system and method determine, for each managed device, an interest factor for each of the management operations and weighting factors for each managed device based on the interest factors and the significance factors. A management console display may be generated wherein the display indicates, whether in graphical or textual form, high priority managed devices, where the high priority devices are selected from the entire population of managed devices, based on the weighting factors. In this manner, the weighting factors are used to display only the highest priority devices so that the display presents the IT administrator with information that is inherently focused on the devices of most significance from the IT administrator's perspective. The IT administrator may adjust a weighting factor threshold to adjust the magnitude of the filtering, e.g., adjusting the weighting factor threshold to display 10% of managed devices when the number of managed devices is relatively low, e.g., 100 or less, while adjusting the weighting factor threshold to 1% when the number of managed devices is higher, e.g., approximately 1000 managed devices.

Determining a particular interest factor for a particular managed device and a particular management operation may include determining a frequency of the particular management operation with respect to the particular managed device. Recording the instance information may include recording timestamp information associated with each management operation. In such embodiments, determining the frequency may include identifying a particular interval of time, determining a number of instances of the particular management operation corresponding to the particular managed device during the particular interval of time, and determining the frequency based on the number of instances and the particular interval of time.

Determining the weighting factors for the particular managed device may include determining a weighting factor component for each of the particular management operations and summing the weighting factor components. Determining the weighting factor components may include multiplying the significance factor assigned to the particular management operation and the particular interest factor determined for the particular management operation and the particular managed device. In such embodiments, determining the frequency may comprise dividing the number of instances by the particular interval of time. Determining the particular interest factor comprises multiplying the frequency determined and a scaling factor, and determining the weighting factor components comprises multiplying the significance factor by the particular interest factor to obtain a product and dividing the product by the scaling factor. The scaling factor may be substantially any suitable real number. In at least one embodiment, a scaling factor of approximately 10 may be used.

In some embodiments, the method and resource may modify, from time to time, the significance factors based on administrative user input and/or historical management operation information. In some embodiments, the method and resource may select the one or more management operations monitored from a pool of management operations such as the managed devices associated with a particular data center or the managed devices associated with a particular management resource where the management resource may be associated with devices encompassing all or portions of one or more data centers or other similar managed device platforms.

The management operations performed by administrative users may include, without limitation, health monitoring, managing/handling alerts, deploying firmware, updating firmware, device provisioning, reporting, inventory collection, defining permission level, and compliance checks, and the like. Each of these management operations may have its own significance factor and these significance factors may be combined with an interest factor to derive a final weightage factor.

Initial values of significance factors may be set by administrators and dynamically and/or manually adjusted from time to time thereafter. The significance factors may be adjusted to emphasize corresponding management priorities.

The management operations described herein may include functional operations, which represent a super set of each console operation, and there may be a one-to-many relationship between functional areas and operations. A functional area can encompass multiple management operations.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 2 illustrates a significance factor table suitable for use in accordance with disclosed subject matter;

FIG. 3 illustrates an interest factor table suitable for use in accordance with disclosed subject matter;

DETAILED DESCRIPTION

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware (F/W) described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Turning now to disclosed subject matter, IT administrators may frequently be required to identify the managed devices associated with any particular management task. For example, if it is desirable or necessary to perform a health monitoring task, the systems to be monitored must be identified. In such situations, IT administrators may specify a group of systems using any of various approaches such as specifying a range or list of IP addresses, specifying a list of host names, specifying a particular subnet address, or registering the IP addresses of particular systems. However, each of these approaches is dependent upon IT administrators to provide an applicable input such as the range or list of IP addresses.

The managed systems for which a particular management task are performed will most likely change over time for at least two reasons. First, the inventory of information handling systems included within any data center environment of appreciable size and activity is not static as devices are regularly added and removed from service. Second, even for those managed devices that have not been removed from service, it may be appropriate to terminate a particular management task for particular systems. For example, if 90% of information handling systems that have been monitored for a particular interval of time have provided no administrative feedback, it may be appropriate to focus finite administrative resources on other systems. The importance of prioritizing IT management tasks increases as the number of managed devices increases.

In at least one embodiment, disclosed systems and methods prioritize IT management resources in accordance with a significance attribute, referred to herein as a significance factor (SF), and an interest attribute, referred to herein as an interest factor (IF). In some embodiments, the significance factor is a task-specific attribute that reflects the applicable entity's assessment of the comparative importance of various IT management tasks.

Each interest factor may reflect the frequency and/or significance of a particular management operation and a particular managed system. In such embodiments, a significance factor is associated with each management task and an interest factor is associated with each device-task tuple. The significance factors and/or the interest factors may be re-evaluated from time to time, whether periodically, e.g., daily at 2:00 AM, or asynchronously, e.g., in response to a performance and/or availability parameter exceeding a particular threshold. A priority calculator may determine, for each managed device, a weighting factor based on the significance factors and interest factors applicable to the managed device.

In at least one embodiment, the priority calculator considers a group of T management tasks and D managed devices, where T and D are integers greater than 1. The priority calculator may calculate, obtain, or otherwise access a group of T significance factor values. Each of the D managed devices may receive an interest factor corresponding to each of the T management tasks. In such embodiments, the priority calculator may calculate, obtain, or otherwise access a group of V interest factor values, wherein V equals the product of T and D. The priority calculator may then determine a weighting factor for each managed system based on the significance factors and the interest factor values applicable to the particular system.

The weighting factors determined by the priority calculator may be provided to or made accessible to a management resource. The management resource may use the weighting factors to influence management information provided to an IT administrator. In at least one embodiment, a management resource may access the weighting factors and, based on the weighting factors, provide a graphical depiction or textual listing of high priority devices. Such a feature beneficially enables the IT administrator to focus on the devices of highest importance.

Figure 1:
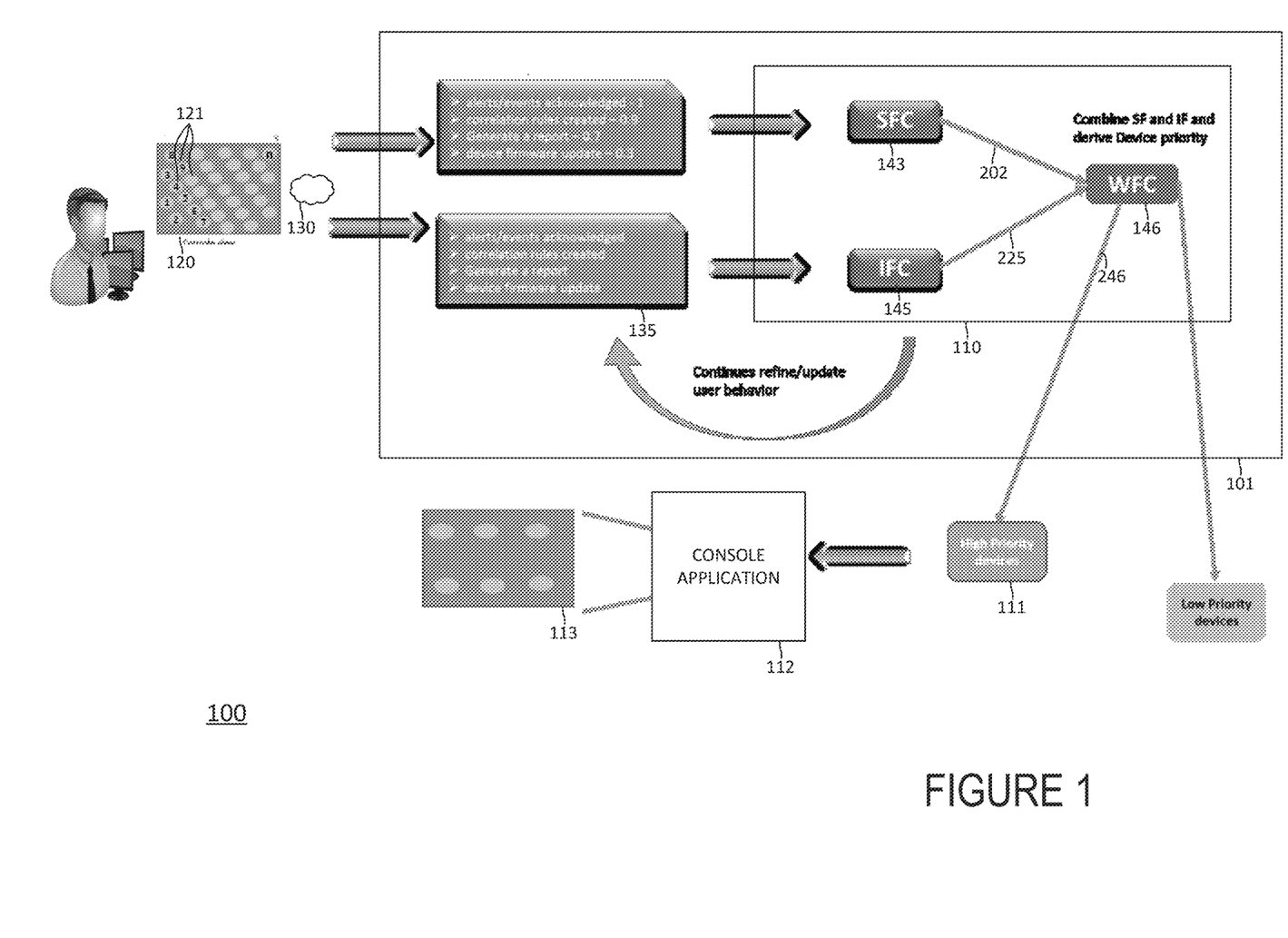
FIG. 1 illustrates a block diagram of an IT administration process in accordance with disclosed subject matter.

FIG. 1 illustrates a block diagram of an IT priority calculator 110 suitable for determining high priority device data 111 that indicates managed devices with a high IT priority in a management platform 100 that includes a management resource 101 coupled, via network 130, to a group of managed devices 121 within a data center 120.

The identification of high priority managed devices by high priority device data 111 enables an administrator console application 112 to influence, focus, or otherwise improve the quality of information an administrator may receive regarding the state of a large number of information handling system resources. As illustrated in FIG. 1, for example, a console application 112 receives or obtains high priority device data 111 to generate an administrator console display or user interface 113 that illustrates, indicates, or otherwise includes only those managed devices 121 that satisfy a priority criteria, e.g., have a priority that is greater than or equal to a threshold priority. In addition, because disclosed embodiments enable administrators to define the significance factors that, in part, determine the priorities, the managed devices identified as high priority are in accordance with the priorities of most interest to the administrators.

The IT priority calculator 110 illustrated in FIG. 1 includes a significance factor coordinator (SFC) 143, an interest factor coordinator (IFC) 145, and a weightings factor calculator (WFC) 146. The SFC 143 may receive and store significance factor input 133, which may correspond to IT administrator input indicative of an administrator's initial determination of significance factors for various management tasks. The SFC 143 of FIG. 1 provides significance factor(s) 202 to WFC 146.

The IFC 145 may be configured to record instance information 135 corresponding to each management operation on a per-device basis. Whenever an instance of a management operation is performed in conjunction with a managed device, instance information 135 may be provided to and recorded by IFC 145. Instance information 135 may include information identifying the applicable managed device and the corresponding management operation. IFC 145 may accumulate instance information data over a defined interval or over an unspecified interval. Over time the number of management operations monitored will be sufficient to assign significance to the frequency with which management operations occur with respect to specific managed devices. This information is referred to as interest factor information and the IFC 145 of FIG. 1 provides interest factor(s) 225 to WFC 146.

The WFC 146 illustrated in FIG. 1 receives the significance factor(s) 202 from SFC 143, the interest factor(s) 225 from IFC 145, and generates weighting factor(s) 246 indicative of high priority devices indicated by high priority device data 111.

FIG. 2 illustrates an example SFC 143 for an example set of significance factors 202. As illustrated in FIG. 2, a significance factor 202 is assigned to or otherwise associated with each of a plurality of functional areas 201. Each functional area 201 may represent one or more management operations associated with the applicable functional area 201.

The use of functional areas 201 in the SFC 143 of FIG. 1 may be suitable when the number of individual management operations is large and/or where the significance factors associated with all management operations associated with the same functional area are substantially equal. In other embodiments, SFC 143 may associate significance factors with individual management operations rather than functional areas 201 as shown in FIG. 1. When functional areas 201 are used within SFC 143, a data structure (not depicted in FIG. 1) may provide an association between each individual management operation and its corresponding functional area.

The list of functional areas 201 included in SFC 143 may vary over time based on IT administrator input. The significance factors 202 indicated for each corresponding functional are 201 may likewise vary based on revised administrator input to reflect changes in management emphasis.

For example, significance factors 202 may be revised following the implementation of a firmware update to emphasize reliability, availability, and basic functionality whereas a mature application service may warrant significance factors emphasizing performance.

Returning to FIG. 1, the IFC 145 illustrated in FIG. 1 receives instance information 135, which may represent information pertaining to each management operation performed by management resource 101. Instance information 135 may identify the applicable managed device 121 as well as the management operation that was performed on or in conjunction with the managed device 121, as well as a timestamp and any other suitable information.

The IFC 145 may accumulate instance information 135 over time and maintain an IFC table for each managed device. FIG. 3 illustrates an example IFC 145 including two or more IFC tables 144, one IFC table 144 for each managed device. As depicted in FIG. 3, IFC table 144 lists the various management operations 221 performed in conjunction with the applicable managed device and, for each particular management operation 221, the number of instances 222 of such operation, the interval or time period 223 during which the applicable operations were encountered, a frequency attribute 224, derived based on the number of instances 222 and the corresponding time period 223, an interest factor 225, calculated for each applicable management operation 221, and an optional scaling factor 226 that may be used in the determination of the interest factor(s) 225.

The interest factor(s) 225 generated by IFC 145 may be provided as inputs to WFC 146. At specified intervals or in response to one or more specified events or criteria, WFC 146 may calculate weighting factor(s) 246 for one or more managed devices 121. In at least one embodiment, WFC 146 calculates weighting factor(s) 246 based on all instances of management operations performed in conjunction with the applicable managed device during the interval of interest.

Figure 4:
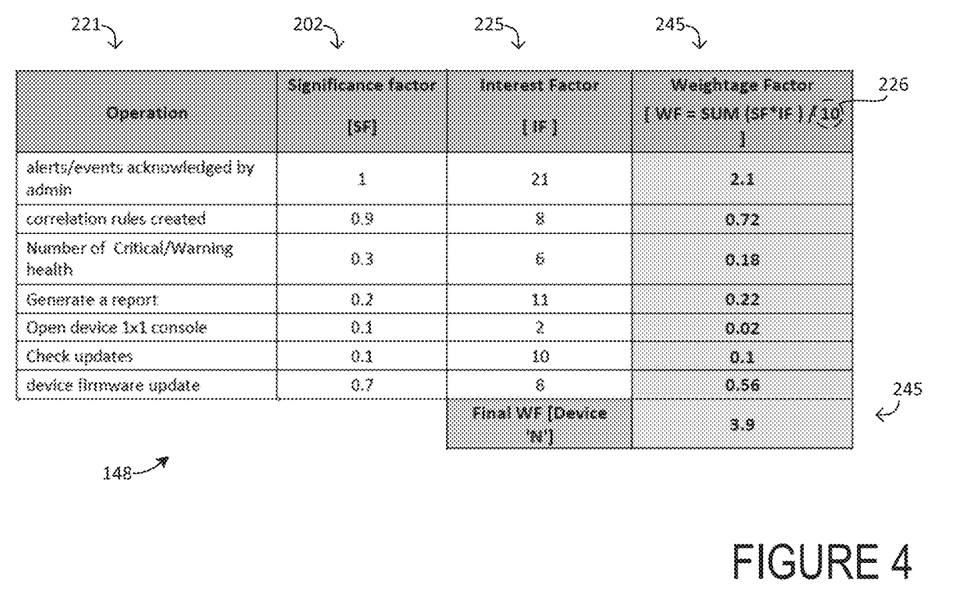
FIG. 4 illustrates a weightage factor table, suitable for use in accordance with disclosed subject matter, for a particular device.
Figure 5:
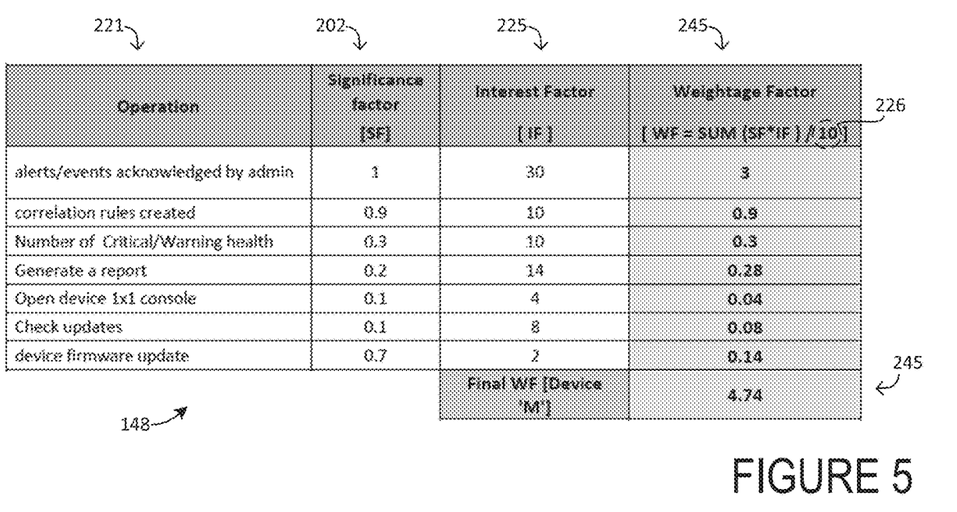
FIG. 5 illustrates an additional weightage factor table, suitable for use in accordance with disclosed subject matter, for an additional device.

FIG. 4 and FIG. 5 illustrate two exemplary WFC tables 148 within WFC 146 to determine weighting factors 246 for two different managed devices 121. Each WFC table 148 illustrated in FIG. 4 and FIG. 5 includes a row corresponding to each management operation 221. Each row of the applicable WFC table 148 includes a significance factor 202 received from SFC 143 and an interest factor 225 received from the appropriate IFC table 144 of IFC 145. The WFC table 148 illustrated in FIG. 4 determines a weighting factor component 245, based on the significance factor 202 and the interest factor 225, for each management operation 221. The weighting factor components 245 illustrated in FIG. 4 represent the product of the corresponding significance factor 242 and the corresponding interest factor 243, divided by the optional scaling factor 226. The sum of all of the weighting factors components 245 determines the weighting factor 246 for the applicable managed device over the applicable interval of time.

FIG. 5 illustrates an example WFC table 148 used by WFC 146 for a second device. By comparing the weighting factors 246 in each WFC table 148, management resource 101 (FIG. 1) may be configured to make a quantitative assessment of device priority. Taking FIG. 4 and FIG. 5 as examples, management resource 101 (FIG. 1) may determine that the managed device associated with the WFC table 148 illustrated in FIG. 5 has a higher priority than the managed devices associated with WFC table 148 of FIG. 4. In such a case, a console application 112 may, as an example, include the managed device associated with the WFC table 148 of FIG. 4 while excluding the managed device associated with the WFC table 148 of FIG. 5.

Figure 6:
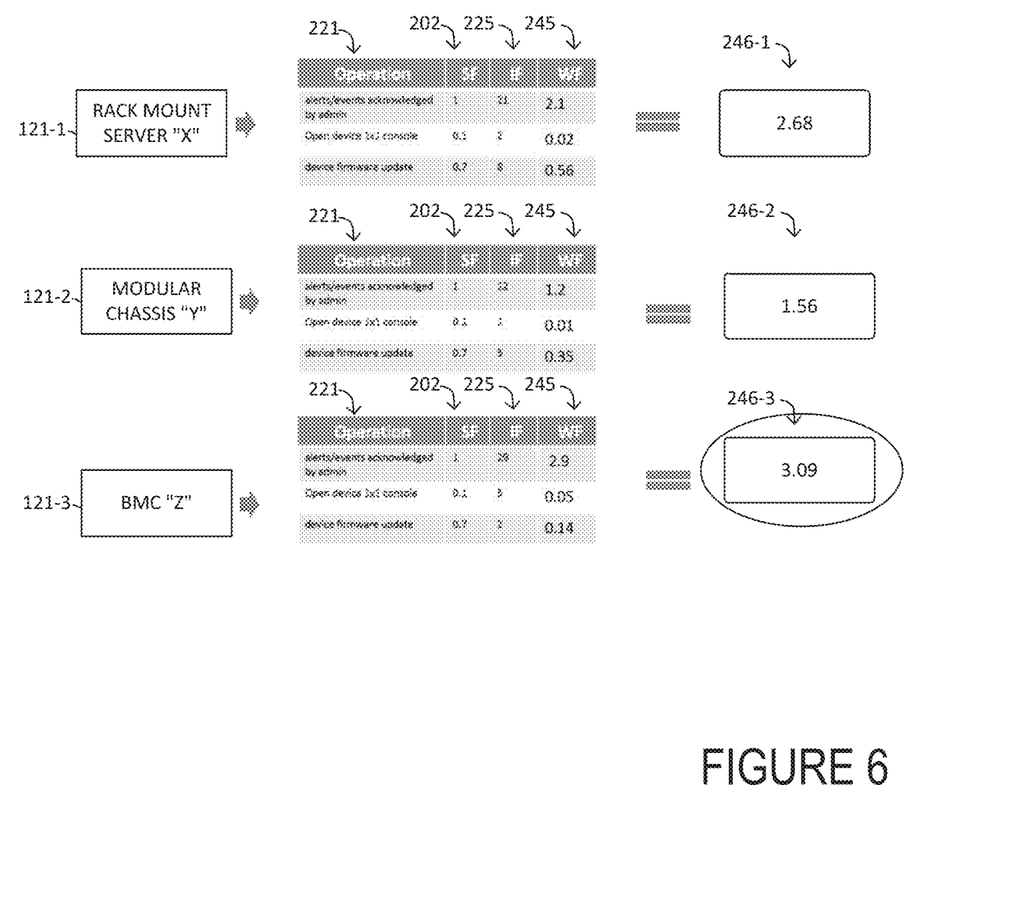
FIG. 6 illustrates weightage factor calculation summaries in accordance with disclosed subject matter.

FIG. 6 illustrates weighting factors 246 determined by WFC 146 for three different managed devices 121. The managed devices illustrated in FIG. 6 include a rack mount server 121-1, a modular chassis 121-2, and a baseboard management controller (BMC) 121-3. For each of the three managed devices 121, FIG. 6 illustrates the management operations 221 performed in conjunction with each managed device, the significance factors 202 associated with each management operation 221, the interest factors 225 associated with each operation-device tuple, the weighting factor components 245 for each management operation 221 and the overall weighting factors 246 for each managed device 121. The example illustrated in FIG. 6 identifies the BMC 121-3 as the highest priority managed device.

Figure 7:
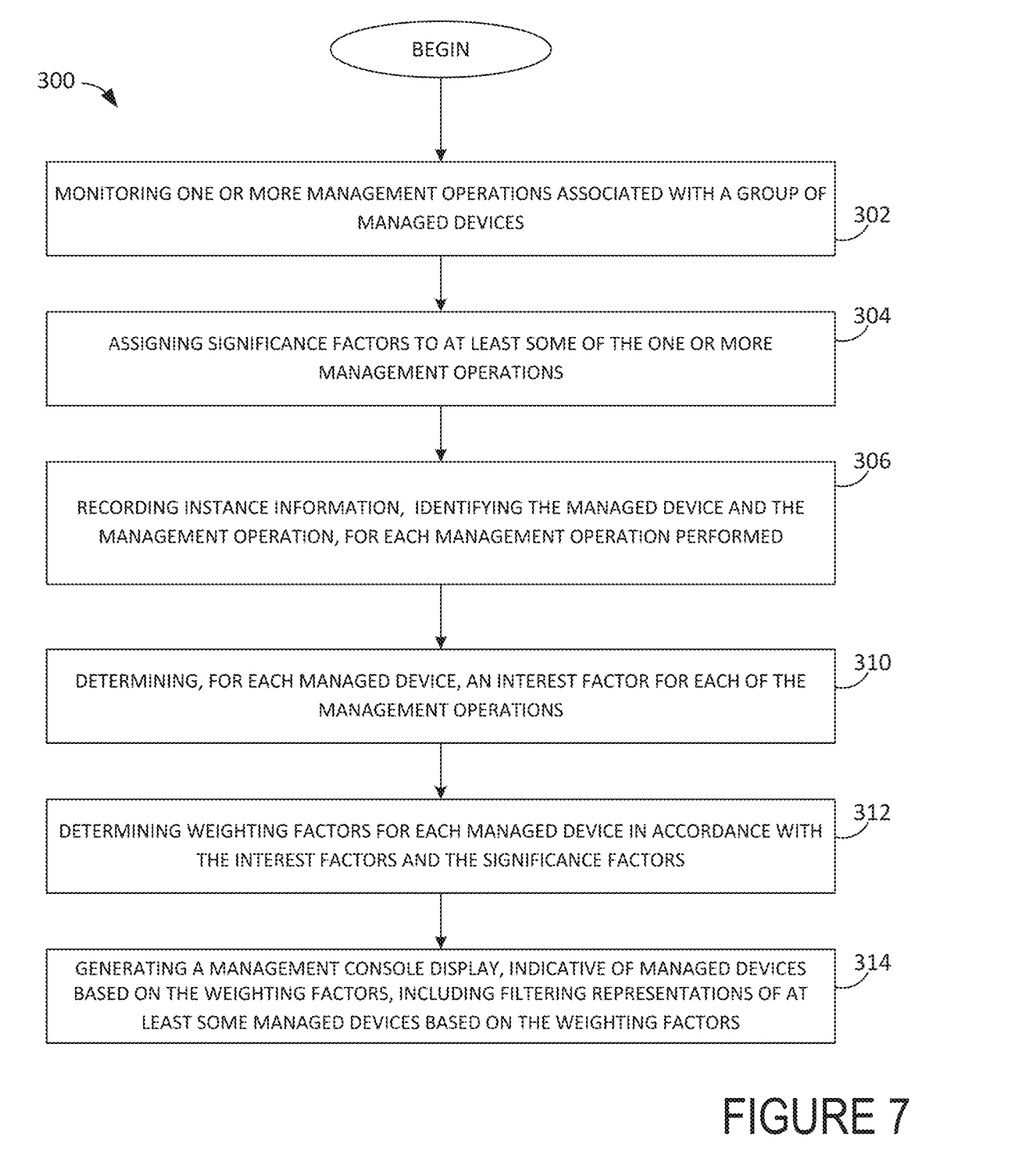
FIG. 7 illustrates a flow diagram of an IT management method in accordance with disclosed subject matter.

FIG. 7 illustrates a flow diagram of a method 300 for prioritizing managed systems. The method 300 illustrated in FIG. 7 includes monitoring (operation 302) one or more management operations associated with a group of managed devices, assigning (operation 304) significance factors to at least some of the one or more management operations, and recording (operation 306) instance information, identifying the managed device and the management operation, for each management operation performed.

The method 300 illustrated in FIG. 7 further includes determining (operation 310) for each managed device, an interest factor for each of the management operations and determining weighting factors for each managed device in accordance with the interest factors and the significance factors. A management console display may be generated wherein the display indicates, whether in graphical or textual form, high priority managed devices, where the high priority devices are selected based on the weighting factors. For example, generating the management console display may include filtering out representations of managed devices based on the weighting factors.

Any one or more processes or methods described above, including processes and methods associated with any flow diagrams, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, F/W, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A method of prioritizing a group of managed devices within a management platform, wherein the method comprises:
    monitoring device management operations performed by a management resource associated with a group of managed devices;
    assigning significance factors to the device management operations;
    recording instance information for each device management operation performed by the management resource, wherein the instance information includes a timestamp and identifies the managed device and the device management operation;
    for each managed device, determining a weighting factor, wherein determining the weighting factor includes:
        determining a frequency factor for each device management operation performed on the managed device, wherein each frequency factor is indicative of a frequency with which a corresponding management operation is performed on the managed device;
        determining weighting factor components for each device management operation performed on the managed device, wherein each weighting factor component is indicative of a product of the significance factor assigned to the device management operation and the frequency factor; and
        determining, from the weighting factor components, the weighting factor for the managed device; and
    generating a management console display including representations of at least some of the managed devices, wherein generating the management console display includes:
        identifying managed devices satisfying a weighting factor threshold;
        including, in the management console display, representations of the managed devices satisfying the weighting factor threshold; and
        responsive to detecting a change in the number of managed devices, adjusting the weighting factor threshold to manage the number of managed devices included in the management console display.

2. The method of claim 1, wherein generating the management console display includes excluding managed devices with management priorities less than a threshold priority.

3. The method of claim 1, wherein determining the frequency factor for a device management operation performed by the management resource on a managed device includes;
    specifying a particular interval of time;
    determining a number of instances of the device management operation performed on the managed device during the particular interval of time; and
    determining the frequency by dividing the number of instances by the particular interval of time.

4. The method of claim 3, wherein determining the frequency factor for a device management operation performed on a managed device includes multiplying the frequency by a scaling factor.

5. The method of claim 3, wherein determining the weighting factor components comprises:
    dividing the product of the significance factor and the interest factor by a scaling factor.

6. The method of claim 1, wherein assigning the significance factors includes assigning, by an administrative user of the management resource, significance factors to at least some of the device management operations.

7. The method of claim 5, wherein the scaling factor is approximately 10.

8. The method of claim 1, further comprising, modifying, from time to time, the significance factors based on at least one of:
    administrative user input; and
    historical device management operation information.

9. The method of claim 1, further comprising:
    selecting the device management operations to be monitored from a pool of device management operations, wherein the pool of device management operations includes one or more device management operations selected from:
    health monitoring operations for monitoring a health status of a managed device, alert handling operations, firmware deployment operations, firmware update operations, device provisioning operations, and permission defining operations.

10. The method of claim 1, wherein each managed device is associated with a management resource and wherein the group of managed devices comprises managed devices associated with a particular management resource.

11. The method of claim 1, wherein each managed device is associated with a data center and wherein the group of managed devices includes devices associated with a particular data center.

12. A management resource, comprising:
    a central processing unit (CPU);
    a management network interface for communicatively coupling the CPU to a group of managed devices via a management network; and
    a computer readable medium including instructions, executable by the CPU wherein the instructions, when executed, cause the management resource to perform prioritizing operations comprising:
        monitoring device management operations performed by a management resource associated with a group of managed devices;

assigning significance factors to the device management operations;

recording instance information for each device management operation performed by the management resource, wherein the instance information includes a timestamp and identifies the managed device and the device management operation;

for each managed device, determining a weighting factor, wherein determining the weighting factor includes:
- determining a frequency factor for each device management operation performed on the managed device, wherein each frequency factor is indicative of a frequency with which a corresponding management operation is performed on the managed device;
- determining weighting factor components for each device management operation performed on the managed device, wherein each weighting factor component is indicative of a product of the significance factor assigned to the device management operation and the frequency factor; and
- determining, from the weighting factor components, the weighting factor for the managed device; and generating a management console display including representations of at least some of the managed devices, wherein generating the management console display includes:
- identifying managed devices satisfying a weighting factor threshold;
- including, in the management console display, representations of the managed devices satisfying the weighting factor threshold; and
- responsive to detecting a change in the number of managed devices, adjusting the weighting factor threshold to manage the number of managed devices included in the management console display.

13. The management resource of claim 12, wherein determining the frequency factor for a device management operation performed on a managed device includes:
- specifying a particular interval of time;
- determining a number of instances of the device management operation performed on the managed device during the particular interval of time; and
- determining the frequency by dividing the number of instances by the particular interval of time.

14. The management resource of claim 13, wherein determining the frequency factor for a device management operation performed on a managed device-includes multiplying the frequency by a scaling factor.

15. The management resource of claim 14, wherein determining the weighting factor components comprises:
- dividing the product of the significance factor assigned to the device management operation and the frequency factor determined for the device management operation by the scaling factor.

16. The management resource of claim 15, wherein the scaling factor is approximately 10.

17. The management resource of claim 12, wherein the prioritizing operations include, modifying, from time to time the significance factors based on at least one of:
- administrative user input; and
- historical device management operation information.

18. The management resource of claim 12, wherein each managed device is associated with a data center and wherein the group of managed devices includes devices associated with a particular data center.

* * * * *